US008477048B2

(12) United States Patent
Botargues et al.

(10) Patent No.: US 8,477,048 B2
(45) Date of Patent: Jul. 2, 2013

(54) METHOD AND DEVICE FOR PREVENTING AN ANTI-COLLISION SYSTEM ON BOARD AN AIRPLANE FROM EMITTING ALARMS, DURING AN ALTITUDE CAPTURE MANEUVER

(75) Inventors: Paule Botargues, Toulouse (FR); Xavier Dal Santo, Biagnac (FR); Olivier Sapin, Toulouse (FR); Vincent Bompart, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 407 days.

(21) Appl. No.: 13/016,154

(22) Filed: Jan. 28, 2011

(65) Prior Publication Data

US 2011/0187561 A1   Aug. 4, 2011

(30) Foreign Application Priority Data

Feb. 2, 2010   (FR) ...................... 10 50719

(51) Int. Cl.
G08G 5/04 (2006.01)
G01C 21/00 (2006.01)
G06F 17/10 (2006.01)
G05D 1/00 (2006.01)
G01S 13/00 (2006.01)
G01S 3/02 (2006.01)

(52) U.S. Cl.
USPC ........... 340/961; 340/463; 340/471; 340/970; 340/976; 340/977; 701/23; 701/24; 701/121; 701/301; 342/29; 342/30; 342/36; 342/455

(58) Field of Classification Search
USPC ................ 340/970, 961, 976, 977, 468, 463, 340/471, 469; 701/4, 5, 18, 123, 121, 301, 701/23, 24, 408; 342/29, 30, 36, 455
See application file for complete search history.

(56) References Cited

U.S. PATENT DOCUMENTS

| 6,002,347 | A * | 12/1999 | Daly et al. | 340/963 |
| 6,127,944 | A * | 10/2000 | Daly et al. | 340/963 |
| 6,182,005 | B1 * | 1/2001 | Pilley et al. | 701/120 |
| 6,510,388 | B1 * | 1/2003 | Sporrong et al. | 701/301 |
| 6,833,797 | B2 * | 12/2004 | Ishihara | 340/946 |
| 7,116,266 | B1 * | 10/2006 | Vesel et al. | 342/30 |
| 7,516,014 | B2 * | 4/2009 | Hammarlund et al. | 701/301 |

(Continued)

FOREIGN PATENT DOCUMENTS

| EP | 1240636 | 2/2004 |
| EP | 1630766 | 3/2006 |
| EP | 2113897 | 11/2009 |
| FR | 2876483 | 4/2006 |

OTHER PUBLICATIONS

French Republic Institut National De La Propriete Industrielle, Preliminary Search Report, FR 1050719, Oct. 1, 2010 (2 pgs.).

*Primary Examiner* — Daniel Wu
*Assistant Examiner* — Mancil Littlejohn
(74) *Attorney, Agent, or Firm* — Wood, Herron & Evans, LLP

(57) ABSTRACT

According to the invention, the device (1) comprises means (3) for detecting, during an altitude capture maneuver, the emission of a first type alarm by the anti-collision system (2) and means (4) for controlling the vertical speed of said airplane (AC), after the emission of such an alarm, until the triggering of the capture phase.

9 Claims, 3 Drawing Sheets

U.S. PATENT DOCUMENTS

Figure 1:
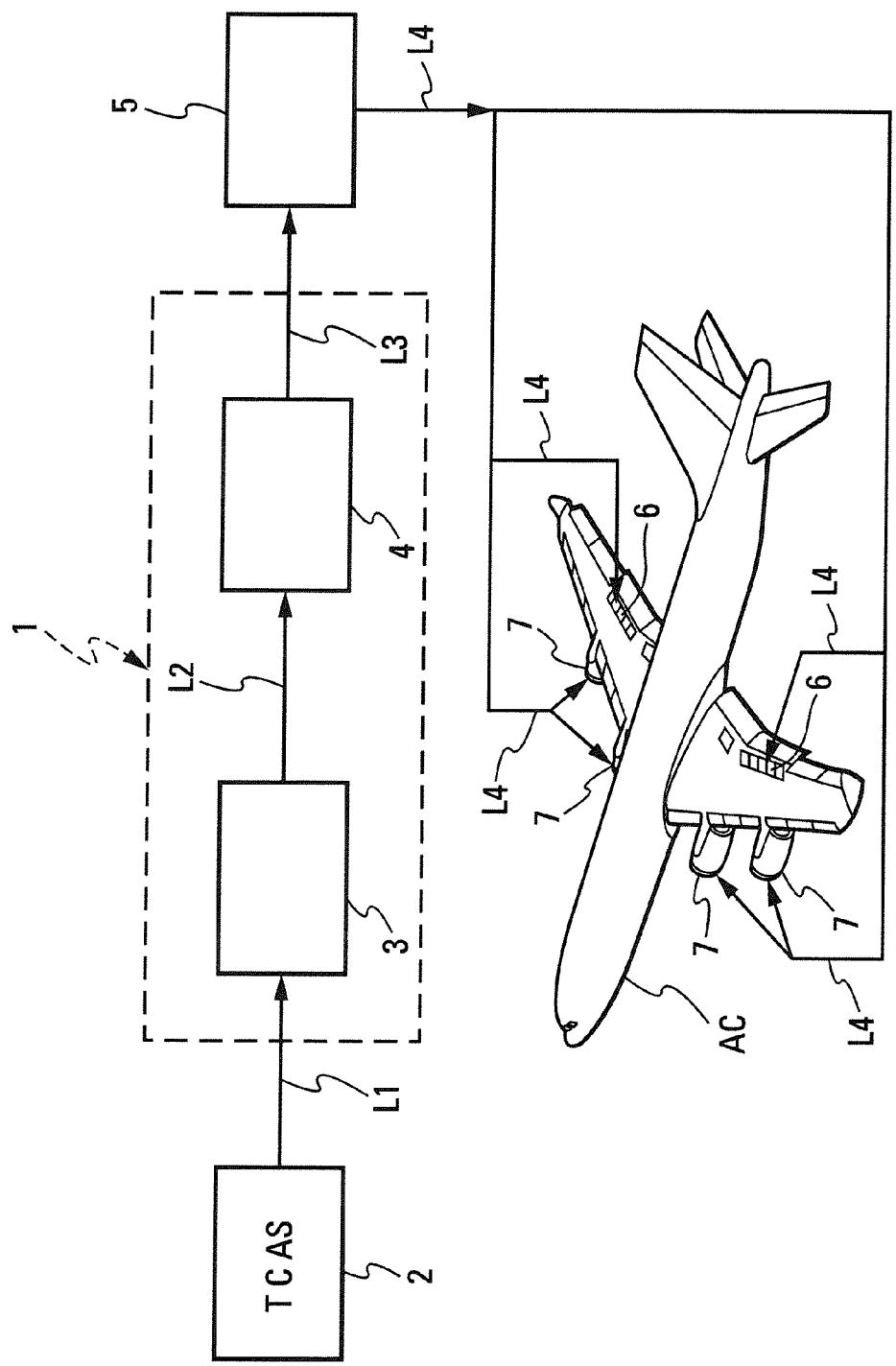

| | | | |
|---|---|---|---|
| 7,693,620 B2 * | 4/2010 | Dubeck et al. | 701/16 |
| 7,714,744 B1 * | 5/2010 | Wichgers | 340/965 |
| 8,078,345 B2 * | 12/2011 | Botargues et al. | 701/16 |
| 8,145,365 B2 * | 3/2012 | Flotte et al. | 701/8 |
| 8,200,421 B2 * | 6/2012 | Botargues et al. | 701/301 |
| 8,234,020 B1 * | 7/2012 | Wichgers et al. | 701/9 |
| 8,296,054 B2 * | 10/2012 | Botargues et al. | 701/301 |
| 2008/0021647 A1 * | 1/2008 | Daveze et al. | 701/301 |

* cited by examiner

METHOD AND DEVICE FOR PREVENTING AN ANTI-COLLISION SYSTEM ON BOARD AN AIRPLANE FROM EMITTING ALARMS, DURING AN ALTITUDE CAPTURE MANEUVER

The present invention relates to a method and a device for preventing an anti-collision system on board an airplane from emitting at least some alarms, during an altitude change maneuver comprising an approach phase, followed by a phase for capturing a set altitude level, as well as an airplane provided with such a device.

As known, most airliners are provided with anti-collision systems (generally referred to TCAS for Traffic Collision Avoidance Systems) allowing to ensure the safety of the air traffic while preventing risks of on flight collision.

Thus, when two airplanes are converging one to the other, the anti-collision systems thereof calculate an estimation of the collision time and emit an alarm informing the crews of each airplane about a possible future collision: such an alarm is generally referred to as "traffic notification" or first type "TA alarm". If appropriate, said anti-collision systems further emit, to the attention of the crew, an avoidance maneuver command in the vertical plane so as to get out of the collision possibility situation: such an avoidance maneuver command is generally referred to as "resolution notification" or second type "RA alarm". The first type TA alarms and of the second type RA alarms are materialized by vocal messages and by information being displayed in the cockpits.

In practice, an anti-collision system on board an airplane calculates a collision time in the horizontal plane (ratio between the horizontal distance separating two airplanes and their relative horizontal speed) and a collision time in the vertical plane (ratio between the vertical height of both airplanes and their relative vertical speed). Said thus calculated collision times are compared to predetermined alarm thresholds for the TA alarms and for the RA alarms (said predetermined thresholds being a function of the altitude) and the alarms are triggered when the calculated collision times are lower than the corresponding predetermined thresholds.

Moreover, as known, it is frequent that an airplane should capture (climbing or descending) a stabilized altitude level (referred to as set level) close to another altitude level allocated to another airplane, and that, according to the air traffic rules, two close stabilized altitude levels are only separated by 300 m (1000 feet).

Thus, because of such a low altitude difference between the stabilized altitude levels, the high vertical speed of modern airplanes and the large size of the air traffic, the anti-collision systems generate numerous TA and RA alarms, while an airplane, vertically moving for changing altitude, correctly maneuvers without any collision risk with another airplane. Such alarms induce much stress for the pilots and are considered operationally useless by the latter, as the altitude change maneuver is correct and taking into consideration such alarms leads, in most cases, to the air traffic being disturbed.

Moreover, the second type RA alarms during the altitude capture phases are very numerous and are considered to account currently for more than 50% of the total of such alarms in the European space, such a percentage being able to increase in the future as a result of the development of the air traffic.

The present invention aims at overcoming such drawbacks, and more specifically at preventing at least some alarms from being emitted by the anti-collision system on board an airplane during an altitude change maneuver.

To this end, according to this invention, the method for preventing at least some alarms from being emitted by an anti-collision system on board an airplane during an altitude change maneuver comprising an approach phase followed by a phase for capturing a set level, said anti-collision system on board being able to detect at least one intrusive aircraft being located in the air environment of said airplane, to calculate a theoretical collision time between said airplane and said intrusive aircraft and to emit first type and second type alarms, when such a theoretical collision time is lower respectively than a first and a second predetermined triggering thresholds, is remarkable in that, when said airplane is flying to said set level with a vertical speed, the absolute value of which is at least equal to one first predetermined vertical speed threshold, the following steps are carried out for preventing a second type alarm from being emitted:

the emission of a first type alarm is first detected;
in the case where said detected first type alarm occurs when the height separating said airplane from said set level is at the most equal to a predefined height threshold, the vertical speed of said airplane is decreased, so that the absolute value thereof is equal to said first threshold of vertical speed, so as to maintain the theoretical collision time associated with a second type alarm above the second triggering threshold; and
in the case where said detected first type alarm occurs when the height separating said airplane from said set level is strictly higher than said height threshold;
i) as long as the height separating said airplane from said set level remains strictly higher than said height threshold, the vertical speed of said airplane is reduced so that the absolute value thereof is equal to a second predetermined vertical speed threshold; and
ii) then, when the height separating said airplane from said set level is at the most equal to said height threshold, the vertical speed of said airplane is limited so that the absolute value thereof is equal to said first vertical speed threshold, until said capture phase is initiated, so as to maintain the theoretical collision time associated with a second type alarm above the second triggering threshold.

Thus, by means of this invention, by controlling the vertical speed of the airplane after the emission of a first type TA alarm, the collision time is maintained, associated with a second type RA alarm, above the corresponding triggering threshold, allowing to prevent such a RA alarm from being untimely triggered. In other words, the method of this invention relies, on the one hand, on the detection of a TA alarm (corresponding to the presence of air traffic in the capture area) and, on the other hand, on controlling the vertical speed of said airplane after such a detection.

It should be appreciated that, when the airplane is provided with an automatic piloting system, the latter cannot acquire any other information originating from the anti-collision system, except that relating to the emission of a first type TA alarm.

Preferably, said second vertical speed threshold depends on the height separating the airplane from said level of reference to be reached and the vertical speed of said airplane, at the time of the emission of said first type alarm.

In particular, said second vertical speed threshold could be determined by a linear interpolation of a predetermined set of values of vertical speed, each one of said values being associated with a couple of values comprising a height value separating said airplane from said set level and a vertical speed value of said airplane, at the time of the emission of a first type alarm.

Moreover, after a first type alarm has been emitted and detected when the height separating said airplane from said set level is strictly higher than said height threshold and that the absolute value of the vertical speed of said airplane is equal to said second speed threshold, in the case where a new first type alarm is emitted for a height of said airplane compared to said set level always strictly higher than said height threshold, said vertical speed of said airplane can be advantageously reduced again, so that the absolute value thereof is equal to a third speed threshold.

In such a case, said third threshold of vertical speed depends, preferably, on the height separating said airplane from said set level and on the vertical speed of said airplane at the time of the emission of the new first type alarm.

Preferably, the values of the speeds of said predetermined set are such that the reduction of the vertical speed of said airplane, in step i), results in a limited increase of the time necessary to said airplane to cause the height separating it from said set level to be at the most equal to said height threshold, as from the emission of said first type alarm.

Furthermore, said capture phase could be initiated when the height separating said airplane from said set level to be reached is at the most equal to a predetermined capture height, defined by the following equation:

$$hc = \frac{Vz^2}{2g|nz|}$$

wherein:
hc is the capture height;
Vz is the vertical speed of said airplane;
g is the gravity acceleration; and
nz is the constant vertical load factor.

Moreover, the present invention relates to a device for preventing at least some alarms from being emitted by an anti-collision system on board an air-plane during an altitude change maneuver comprising an approach phase followed by a phase for capturing a set level, said anti-collision system being able to detect at least one intrusive aircraft being located in the air environment of said airplane, to calculate a theoretical collision time between said airplane and said intrusive aircraft and to emit first type and second type alarms, when such a theoretical collision time is lower respectively than a first and a second predetermined triggering thresholds, According to the invention, said airplane flying to said set level with a vertical speed the absolute value of which is at least equal to a first predetermined vertical speed threshold, said device comprises:
  means for detecting the emission of a first type alarm by the anti-collision system;
  means for controlling the vertical speed of said airplane so that:
    in the case where said detected first type alarm occurs when the height separating said airplane from said set level is at the most equal to a predefined height threshold, they reduce the vertical speed of said airplane so that the absolute value thereof is equal to said first vertical speed threshold; and
    in the case where said detected first type alarm occurs when the height separating said airplane from said set level is strictly higher than said height threshold:
      as long as the height separating said airplane from said set level remains strictly higher than said height threshold, the controlling means reduce the vertical speed of said airplane so that the absolute value thereof is equal to a second predetermined vertical speed threshold, so as to maintain the theoretical collision time associated with a second type alarm above the second triggering threshold; and
      when the height separating said airplane from said set level is at the most equal to said height threshold, said controlling means limit the vertical speed of said airplane so that the absolute value thereof is equal to said first vertical speed threshold, until said capture phase is initiated, so as to maintain said calculated collision time associated with a second type alarm above the second triggering threshold.

Furthermore, the present invention further relates to an airplane comprising a device of the type as described hereinabove.

The figures of the appended drawing will better explain how this invention can be implemented. In these figures, like reference numerals relate to like components.

FIG. 1 is a block diagram of a device according to the present invention allowing RA alarms to be prevented from being emitted by an anti-collision system on board an airplane, during an altitude change maneuver.

Figure 2:
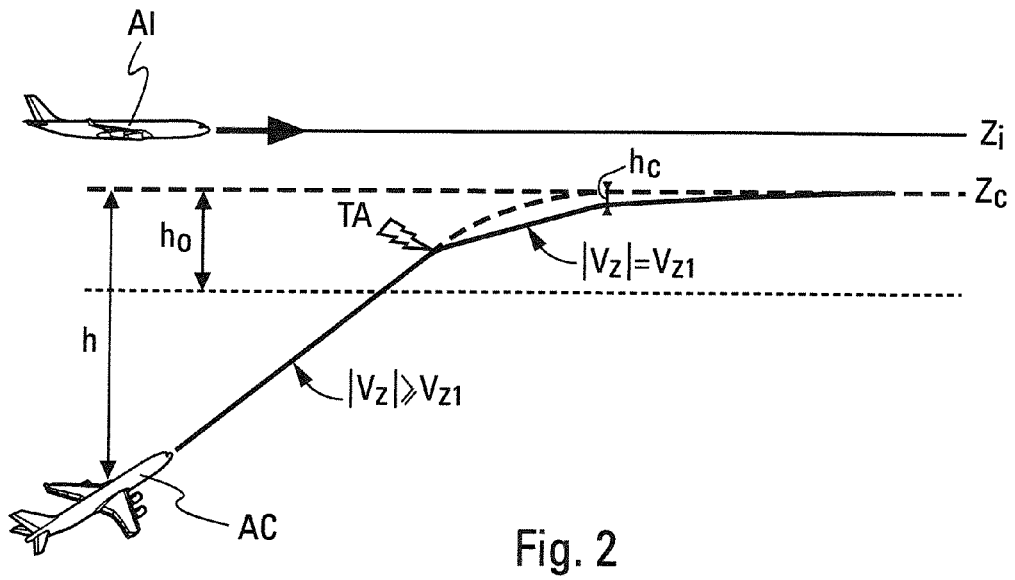
Figure 3:
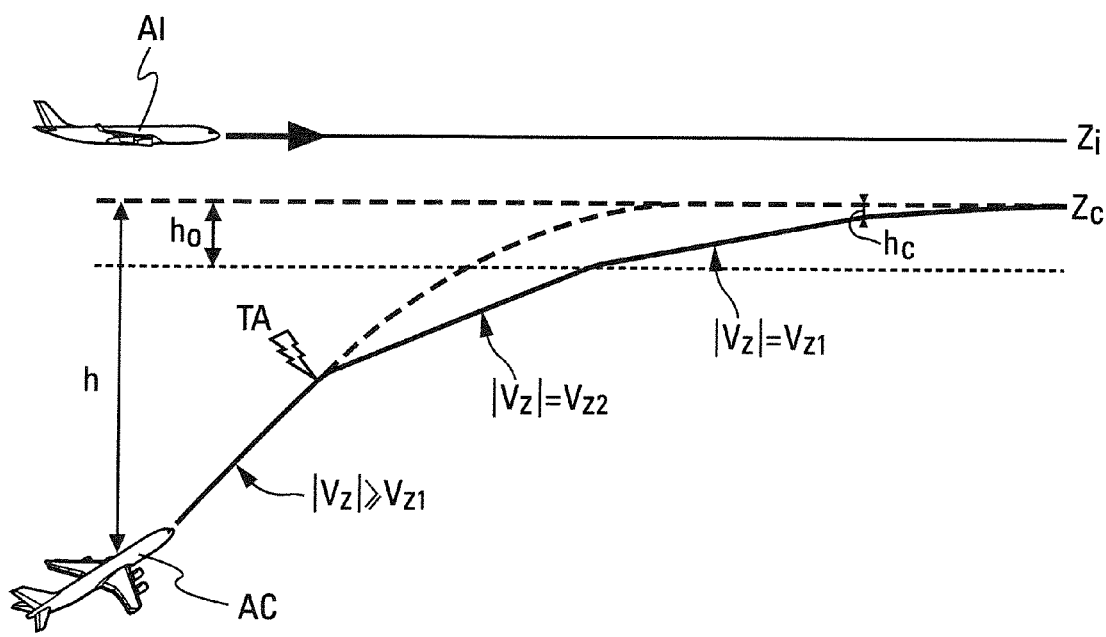
Figure 4:
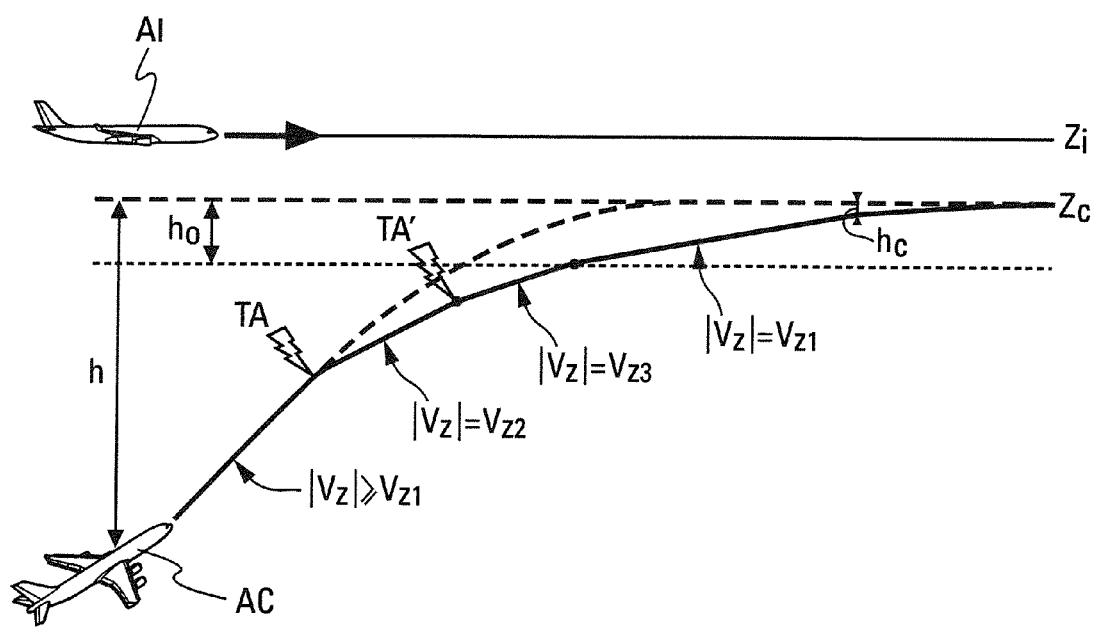

FIGS. 2 to 4 schematically illustrate an altitude change maneuver of an airplane provided with the device of FIG. 1, being interrupted, by the emission of TA alarms, at respectively different times.

On FIG. 1, is shown, in a block diagram form, a device 1 according to this invention, on board an airplane AC. Such a device 1 is to be used for preventing second type RA alarms from being emitted by a TCAS 2 anti-collision system on board the airplane AC, when the latter is carrying out an altitude change maneuver for capturing a set level Zc. On this FIG., the device 1, the anti-collision system 2 and a flight calculator 5 are represented outside the airplane AC, whereas they are actually mounted on board the latter.

As known, the anti-collision system 2 is able to detect an intrusive aircraft AI in the air environment of the airplane AC, to calculate a theoretical collision time between the latter and said intrusive aircraft AI and to emit first type TA alarms and second type RA alarms for the attention of the crew of the airplane AC in the case where said theoretical collision time is lower respectively than a first and a second predetermined thresholds.

Moreover, the altitude change maneuver is defined by the three following phases:
  an approach phase (climbing or descent), during which the approach trajectory of the airplane AC is substantially rectilinear and is implemented at a substantially constant vertical speed Vz up to a capture height hc separating the airplane from the set level Zc to be reached;
  an altitude capture phase, starting when the height h of the airplane AC with respect to the level Zc is at the most equal to the capture height hc (i.e. h≦hc). During the capture phase, the capture trajectory of the airplane AC is rounded, for example parabolic and is tangent to the set level Zc. The capture height hc is defined by the following equation:

$$hc = \frac{Vz^2}{2g|nz|}$$

wherein Vz is the vertical speed of said airplane AC, g is the gravity acceleration and nz is the constant vertical load factor of the airplane AC; and a stabilization phase, during which the trajectory of the airplane AC follows said set level Zc.

Although the airplane AC correctly carries out its capture of set level Zc and there is no risk of collision with an intrusive aircraft AI, it is possible that the anti-collision system 2 of said airplane AC emits a TA alarm, for example, because it has detected such an intrusive aircraft AI beyond the set level Zc at the altitude Zi. If the airplane maintains its usual flight configuration, a RA alarm could be emitted by the anti-collision system 2. Such a RA alarm, although useless, could result in the air traffic being disturbed when it is followed by a change of trajectory carried out by the pilots.

Thus, by means of this invention, in order to prevent a RA alarm from being emitted during an altitude change maneuver, the vertical speed of the airplane AC is automatically checked, upon the emission of a TA alarm. Obviously, a manual check of the vertical speed by the pilots could also be contemplated.

Subsequently, it is considered that the airplane AC carries out an altitude change maneuver and flies to the set level Zc to be reached with a vertical speed Vz, the absolute value of which is at least equal to a first predetermined vertical speed threshold $Vz1$ (i.e. $|Vz| \geq Vz1$), for example, obtained by digital simulations.

According to this invention, as shown on FIG. 1, the device 1 comprises:
- means 3 for detecting, during an altitude change maneuver, the emission of a TA alarm by the anti-collision system 2. Such means 3 are connected to the anti-collision system 2 via a link L1;
- means 4 for controlling the vertical speed Vz of the airplane AC during the maneuver, upon the detection of a TA alarm by the means 3, to which they are connected via a link L2. To this end, the means 4 are able to deliver, in outlet, appropriate vertical speed commands.

The flight calculator 5, connected to the controlling means 4 via a link L3, is able to deliver control commands corresponding to the vertical speed commands received from the means 4. Such control commands are for example transmitted, via the links L4, to surface actuators 6 allowing for the longitudinal check of the airplane AC (elevators, airbrakes) and/or to the engines 7 of said airplane, so as to apply the vertical speed orders determined by the means 4. It should be appreciated that the calculator 5 could be part of the automatic piloting system of the airplane AC when the latter is provided therewith.

It should be appreciated that the device 1 of this invention could be integrated, at least partially, in such an automatic piloting system (not shown on the FIGS.).

As illustrated on FIG. 2, in the case where a TA alarm is detected by the means 3 during a climbing altitude change maneuver (an intrusive aircraft AI flying at an altitude Zi), when the height h separating the airplane AC from the set level Zc is at the most equal to a height threshold ho (i.e. $h \leq ho$), for example empirically determined through experiments, the controlling means 4 reduce the vertical speed Vz of the airplane transmitting a vertical speed order to the calculator 5 (link L3), so that the absolute value of Vz is equal to the first threshold of vertical speed Vz1 (i.e. $|Vz|=Vz1$).

Thus, the normal trajectory of the airplane AC (shown in broken lines on FIG. 2) not interrupted by a TA alarm is modified during the emission of a TA alarm (the modified trajectory being shown in solid line).

Moreover, as shown on FIG. 3, in the case where a TA alarm is detected by the means 3 (an intrusive aircraft AI flying at an altitude Zi), when the height h is strictly higher than the height threshold ho (i.e. h>ho):
- as long as the height h remains strictly higher than the height threshold ho, the controlling means 4 reduce the vertical speed Vz of the airplane AC so that the absolute value thereof is equal to a second predetermined vertical speed threshold Vz2 (i.e. $|Vz|=Vz2$); and
- when the height h is at the most equal to said height threshold ho ($h \leq ho$), the controlling means 4 limit the vertical speed Vz so that the absolute value thereof is equal to said first vertical speed threshold (i.e. $|Vz|=Vz1$), until the capture phase is initiated (i.e. when h=hc).

Thus, the normal trajectory of the airplane AC without TA alarm (represented in broken lines on FIG. 3) is adapted in the case of the emission of a TA alarm so as to prevent a RA alarm from being subsequently triggered (the modified trajectory being represented in solid line).

It should be appreciated that during the capture phase, the airplane AC follows a parabolic trajectory (its load factor being constant in the geographical reference point) until its reaches the set level Zc (hc being determined so that the parabolic trajectory becomes tangent to Zc at the end of the capture phase).

According to this invention, the second vertical speed threshold Vz2 depends on the height h separating the airplane AC from the set level Zc to be reached and on the vertical speed Vz of the airplane, at the time of the emission of a TA alarm, during an altitude change maneuver.

In particular, Vz2 is determined by a linear interpolation of a predetermined set of values of vertical speed, each one of said values being associated with a couple of values (h, Vz) comprising a height value h separating the airplane AC from the set level Zc and a vertical speed value Vz of said airplane AC, at the time of the emission of a TA alarm. The predetermined set of values of vertical speed is for example saved in a memory (not shown) of said controlling means 4.

In a particular embodiment, the values of the speeds of the predetermined set are such that the reduction of the vertical speed Vz of the airplane AC, by the controlling means 4, results in a limited increase (for example, by 30 s) of the time necessary for the airplane AC to cause the height h separating it from the set level Zc to be at the most equal to the height ho, as from the emission of the TA alarm.

Furthermore, as shown on FIG. 4, after a TA alarm has been emitted, when the height h is strictly higher than the height ho (i.e. h>ho) and the absolute value of the vertical speed Vz of said airplane AC is equal to Vz2 (i.e. $|Vz|=Vz2$), in the case where a new TA alarm is emitted for a height h always strictly higher than ho (i.e. h>ho), the controlling means 4 reduce again the vertical speed Vz of the airplane AC so that the absolute value thereof is equal to a third speed threshold Vz3 (i.e. $|Vz|=Vz3$).

Again, the normal trajectory of the airplane AC not provided with a TA alarm (in broken line on FIG. 4) is modified during the emission of the two TA and TA' alarms (the trajectory modified being shown in solid line).

The third vertical speed threshold Vz3 could depend on the height separating the airplane AC from the set level Zc as well as from the vertical speed Vz of AC, at the time of the emission of the new TA' alarm. It could be determined by a linear interpolation similar to that implemented for determining Vz2 or using any other appropriate way.

Of course, it could be contemplated implementing one or more predetermined vertical speed thresholds, similar to Vz2 and Vz3.

On FIGS. 2 to 4, the altitude capture to be shown aims at reaching a higher set altitude. It is well understood that this invention applies similarly to the capture of a lower set altitude.

The invention claimed is:

1. A method for preventing at least some alarms from being emitted by an anti-collision system (2) on board an airplane (AC) during an altitude change maneuver comprising an approach phase followed by a phase for capturing a set level (Zc), said anti-collision system (2) being able to detect at least one intrusive aircraft (AI) being located in the air environment of said airplane (AC), to calculate a theoretical collision time between said airplane (AC) and said intrusive aircraft (AI) and to emit first type alarms (TA) and second type alarms, when such a theoretical collision time is lower respectively than a first predetermined triggering threshold and a second predetermined triggering threshold, characterized in that, when said airplane (AC) is flying to said set level (Zc) with a vertical speed (Vz), the absolute value of which is at least equal to a first predetermined vertical speed threshold (Vz1), the following steps are carried out for preventing a second type alarm from being emitted:

the emission of a first type alarm (TA) is first detected;

in the case where said first type detected alarm (TA) occurs when the height (h) separating said airplane (AC) from said set level (Zc) is at the most equal to a predefined height threshold (ho), the vertical speed (Vz) of said airplane (AC) is reduced so that the absolute value thereof is equal to said first vertical speed threshold (Vz1), so as to maintain the theoretical collision time associated with a second type alarm above the second triggering threshold; and in the case where said first type detected alarm (TA) occurs when the height (h) separating said airplane (AC) from said set level (Zc) is strictly higher than said height threshold (ho):

i) as long as the height (h) separating said airplane (AC) from said set level (Zc) remains strictly higher than said height threshold (ho), the vertical speed (Vz) of said airplane (AC) is reduced so that the absolute value thereof is equal to a second predetermined vertical speed threshold (Vz2); and ii) then, when the height (h) separating said airplane (AC) of said set level (Zc) is at the most equal to said height threshold (ho), the vertical speed (Vz) of said airplane (AC) is limited so that the absolute value thereof is equal to said first vertical speed threshold (Vz1), until said capture phase is initiated, so as to maintain the theoretical collision time associated with a second type alarm above the second triggering threshold.

2. The method according to claim 1, characterized in that said second vertical speed threshold (Vz2) depends on the height (h) separating the airplane (AC) from said set level (Zc) to be reached and on the vertical speed (Vz) of said airplane (AC), at the time of the emission of said first type alarm (TA).

3. The method according to claim 2, characterized in that said second vertical speed threshold (Vz2) is determined by the linear interpolation of a predetermined set of values of vertical speed, each one of said values being associated to a couple of values comprising a height value separating said airplane (AC) from said set level (Zc) and a vertical speed value of said airplane (AC), at the time of the emission of a first type alarm (TA).

4. The method according to claim 1, characterized in that, after a first type alarm (TA) has been emitted and detected when the height (h) separating said airplane (AC) from said set level (Zc) is strictly higher than said height threshold (ho) and the absolute value of the vertical speed (Vz) of said airplane (AC) is equal to said second speed threshold (Vz2), in the case where a new first type alarm (TA') is emitted for a height (h) of said airplane with respect to said set level (Zc) always strictly higher than said height threshold (ho), said vertical speed (Vz) of said airplane (AC) is again reduced so that the absolute value thereof is equal to a third speed threshold (Vz3).

5. The method according to claim 4, characterized in that said third vertical speed threshold (Vz3) depends on the height (h) separating said airplane (AC) from said set level (Zc) and on the vertical speed (Vz) of said airplane (AC), at the time of the emission of the new first type alarm (TA').

6. The method according to claim 1, characterized in that the speed values of said predetermined set are such that the reduction of the vertical speed (Vz) of said airplane (AC), in step i), results in a limited increase of the time necessary to said airplane (AC) to cause the height (h) separating it from said set level (Zc) to be at the most equal to said height threshold (ho), as from the emission of said first type alarm (TA).

7. The method according to claim 1, characterized in that said capture phase is initiated when the height (h) separating said airplane (AC) from said set level (Zc) to be reached is at the most equal to a predetermined capture height (hc), defined by the following equation:

$$hc = \frac{Vz^2}{2g|nz|}$$

wherein:
hc is the capture height;
Vz is the vertical speed of said airplane;
g is the gravity acceleration; and
nz is the constant vertical load factor.

8. A device for preventing at least some alarms from being emitted by an anti-collision system (2) on board an airplane (AC) during an altitude change maneuver comprising an approach phase followed by a phase for capturing a set level (Zc), said anti-collision system (2) being able to detect at least one intrusive aircraft (AI) being located in the air environment of said airplane (AC), to calculate a theoretical collision time between said airplane (AC) and said intrusive aircraft (AI) and to emit first type alarms (TA) and second type alarms, when such a theoretical collision time is lower respectively than a first predetermined triggering threshold and a second predetermined triggering threshold, characterized in that said airplane (AC) flying to said set level (Zc) with a vertical speed (Vz), the absolute value of which is at least equal to a first predetermined threshold of vertical speed (Vz1), said device (1) comprises:

means (3) for detecting the emission of a first type alarm (TA) by the anti-collision system (2);

means (4) for controlling the vertical speed (Vz) of said airplane (AC) such as:

in the case where said first type detected alarm (TA) occurs when the height (h) separating said airplane (AC) from said set level (Zc) is at the most equal to a predefined height threshold (ho), the vertical speed (Vz) of said airplane (AC) is reduced so that the absolute value thereof is equal to said first vertical speed threshold (Vz1), so as to maintain said theoretical collision time associated with a second type alarm above the second triggering threshold; and in the case where said first type detected alarm (TA) occurs when the height (h) separating said airplane (AC) from said set level (Zc) is strictly higher than said height threshold (ho):

as long as the height (h) separating said airplane (AC) from said set level (Zc) remains strictly higher than said height threshold (ho), the controlling means (4) reduce the vertical speed (Vz) of said airplane (AC) so that the absolute value thereof is equal to a second predetermined vertical speed threshold (Vz2); and when the height (h) separating said airplane (AC) from said set level (Zc) is at the most equal to said height threshold (h), said controlling means (4) limit the vertical speed (Vz) of said airplane (AC) so that the absolute value thereof is equal to said first vertical speed threshold (Vz1), until said capture phase is initiated, so as to maintain said calculated collision time associated with a second type alarm above the second triggering threshold.

9. An airplane comprising the device (1) specified in claim 5.

* * * * *